(12) United States Patent
Kuhn (10) Patent No.: US 7,535,408 B2
(45) Date of Patent: May 19, 2009

(54) APPARATUS AND METHODS FOR DETECTION OF MULTIPLE TARGETS WITHIN RADAR RESOLUTION CELL

(75) Inventor: Walter A. Kuhn, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 74 days.

(21) Appl. No.: 11/897,604

(22) Filed: Aug. 31, 2007

(65) Prior Publication Data

US 2009/0058717 A1  Mar. 5, 2009

(51) Int. Cl.
- *G01S 13/24* (2006.01)
- *G01S 13/46* (2006.01)
- *G01S 13/00* (2006.01)
- *G01S 13/44* (2006.01)

(52) U.S. Cl. ............ 342/129; 342/89; 342/91; 342/118; 342/131; 342/132; 342/134; 342/147; 342/149; 342/175; 342/195; 342/200; 342/201; 342/202; 342/204; 702/127; 702/189; 702/190; 702/196

(58) Field of Classification Search ............ 342/27–28, 342/73–103, 118, 128, 133–145, 147–158, 342/175, 192–197, 200–205, 368–384, 350, 342/385, 417; 89/1.11; 375/316; 702/127, 702/189, 190, 196, 197

See application file for complete search history.

(56) References Cited

U.S. PATENT DOCUMENTS

| | | | | |
|---|---|---|---|---|
| H374 H | * | 11/1987 | Abo-Zena et al. | ............ 342/378 |
| 5,121,125 A | * | 6/1992 | Guerci et al. | ............... 342/204 |
| 5,146,229 A | * | 9/1992 | Guerci et al. | ............... 342/204 |
| 5,262,785 A | * | 11/1993 | Silverstein et al. | ............ 342/90 |
| 5,262,789 A | * | 11/1993 | Silverstein | ................. 342/368 |
| 5,359,333 A | * | 10/1994 | Withers, Jr. | ................. 342/378 |
| 5,525,997 A | * | 6/1996 | Kwon | .......................... 342/90 |
| 6,087,974 A | * | 7/2000 | Yu | ............................. 342/147 |
| 6,404,379 B1 | * | 6/2002 | Yu et al. | .................... 342/147 |

(Continued)

OTHER PUBLICATIONS

F.B. Duh et al., "Radar Pulse Compression for Point Target and Distributed Target Using Neural Network"; "Journal of Information Science and Engineering"; vol. 23, year 2007; pp. 183-201; Paper received Nov. 30, 2004, revised May 5, 2005, and accepted Jun. 8, 2005.*

Ramon Nitzberg, "Losses for Frequency Diversity Waveform Systems", article from IEEE Transactions on Aerospace and Electronic Systems, May 1978, pp. 474-486, vol. AES-14, No. 3.

(Continued)

*Primary Examiner*—Bernarr E Gregory
(74) *Attorney, Agent, or Firm*—Howard IP Law Group, PC (57) ABSTRACT

A method and apparatus is operative for multiple target detection in a radar system which employs a radar waveform of two or more frequency diverse subpulses. The apparatus adds coherent processing of the subpulse echo signals to determine the presence of multiple scattering centers within the radar resolution cell. The subpulses are coherently combined and one can then estimate the number of scattering centers by forming a sample covariance matrix between the subpulse frequency channels and then performing an Eigenvalue decomposition. The resulting Eigenvalues represent the signal strengths of the scattering centers when the associated Eigenvectors correspond to the optimal subpulse weights associated with that signal. A single strong Eigenvalue indicates a single target while two or more strong Eigenvalues or those Eigenvalues larger than the noise related Eigenvalues or a threshold, indicates the presence of multiple targets.

10 Claims, 11 Drawing Sheets

U.S. PATENT DOCUMENTS

| | | | | |
|---|---|---|---|---|
| 6,480,139 B1* | 11/2002 | Hoctor | ........................ | 342/195 |
| 6,498,581 B1* | 12/2002 | Yu | ............................... | 342/90 |
| 6,567,034 B1* | 5/2003 | Yu | ............................... | 342/149 |
| 6,642,888 B2* | 11/2003 | Kishigami et al. | ........... | 342/417 |
| 6,801,156 B1* | 10/2004 | Wasiewicz | ................... | 342/95 |
| 6,836,245 B2* | 12/2004 | Kishigami et al. | ........... | 342/417 |
| 6,853,961 B2* | 2/2005 | Chevalier et al. | ............ | 702/196 |
| 6,897,807 B2* | 5/2005 | Kishigami et al. | ........... | 342/417 |
| 7,079,072 B1* | 7/2006 | Abatzoglou | ................... | 342/90 |
| 7,436,358 B2* | 10/2008 | Tanaka | ........................ | 342/417 |
| 7,447,276 B1* | 11/2008 | Beadle | ........................ | 375/316 |
| 7,474,252 B2* | 1/2009 | Natsume et al. | .............. | 342/379 |
| 2003/0085832 A1* | 5/2003 | Yu | ............................... | 342/90 |

OTHER PUBLICATIONS

"Multivariate Analysis", (1979), text by Academic Press by K.V. Marida, J. T. Kent and J. M. Bibby. Chapter 4, titled "Estimation" pp. 96-119.

McGroary, F.; Lindell, K. "A stepped chirp technique for range resolution enhancement"; Telesystems Conference, 1991. Proceedings vol. 1, NTC '91., National Mar. 26-27, 1991 pp. 121-126 Digital Object Identifier 10.1109/NTC.1991.147999.

Wang, Y., Fang, D.G.,"Novel high range resolution approach in microwave imaging", Radar, Sonar and Navigation, IEE Proceedings, vol. 144, Issue 4, Aug. 1997 pp. 177-180.

Donald R. Wehner "High Resolution Radar", Artech House, 1987, Chapter 5, section 5.2, pp. 160-168.

* cited by examiner

APPARATUS AND METHODS FOR DETECTION OF MULTIPLE TARGETS WITHIN RADAR RESOLUTION CELL

FIELD OF INVENTION

The present invention relates to frequency diverse subpulse radar systems and more particularly to a method and apparatus for detecting multiple closely spaced targets employing such a radar system.

BACKGROUND

The prior art is cognizant of the need to detect multiple aircraft flying in close formation. Such aircraft which fly in close formation may appear essentially as a single target to a conventional radar system. In military radars, this can result in underestimating the size of the threat. As one can ascertain, if there are multiple aircraft flying in close formation, and the radar detects this as a single aircraft, then the proper defense may not be provided. Hence, a greater risk of damage may result, especially in a military environment. One approach to addressing this problem has been to design radar systems which support wider bandwidth waveforms. Such systems result in a higher cost and in some cases longer waveform dwell times. The wider bandwidth waveforms often operate on only a limited range window. Thus, these radars use narrow band waveforms a majority of the time and switch to the wide band waveform only for dedicated track beams. Such radars are complicated and much more expensive than conventional radar systems.

Conventional radar systems often use frequency diverse waveforms. These radar systems use a waveform which basically consists of two or more frequency diverse subpulses. The subpulses are transmitted and are then processed in order to detect or identify a target. Such radar systems are operative to detect isolated targets. If there are multiple targets such as a squadron of aircraft flying in close formation, typical prior art radar systems will detect this condition as a single target and thus would not respond to or identify multiple targets.

The present method and apparatus describes a radar processing technique that can be used to detect the presence of multiple unresolved scatterers in a radar return. This technique includes the identification of aircraft flying in formation which would otherwise appear to be a single target based on prior art radar systems.

SUMMARY OF THE INVENTION

A method for detecting multiple targets in a frequency diverse radar system, comprising the steps of, providing a frequency diverse radar employing a radar waveform including at least two frequency diverse subpulses, receiving an echo signal from the frequency diverse radar, processing the received signal in at least two channels, each channel responsive to one of the subpulses, for processing the subpulse non-coherently; integrating both processed subpulses to detect the presence of a target; forming a covariance matrix from each processed subpulse; performing an Eigenvalue decomposition from the matrix; thresholding the decomposed Eigenvalues to select those Eigenvalues indicating a signal strength above a predetermined threshold; wherein if more than one Eigenvalue exceeds the threshold multiple targets are determined.

DETAILED DESCRIPTION

Figures 1, 1A, 1B:
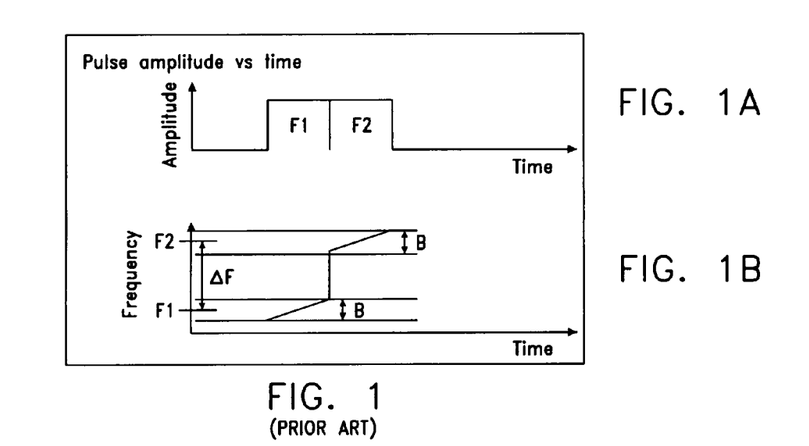
FIG. 1 consists of FIGS. 1A and 1B which show two frequency diverse subpulses including the plot of frequency versus time.

Referring now to the drawings, FIG. 1A shows a graphical representation of pulse amplitude versus time which essentially depicts pulses F1 and F2. FIG. 1A shows two contiguous subpulses but it is known that the pulses F1 and F2 may also be separated in time. FIG. 1B shows the instantaneous pulse frequency versus time which shows the frequency difference between frequencies F1 and F2 as well as showing the instantaneous frequency versus time and the bandwidth B.

Radar systems using a waveform which consists of two or more frequency diverse subpulses as shown in FIG. 1 are well known. The use of frequency diversity waveforms to improve target detectability by reducing the fluctuation loss is a well known technique. Reference is made to an article entitled "Losses for Frequency Diversity Waveforms Systems" by Ramon Nitzberg, which is published in the IEEE Transactions on Aerospace and Electronic Systems, Vol. AES-14 No. 3, May 1978. As one can see the use of multiple carrier frequency waveform has been employed in the prior art. This class of waveform is denoted by either frequency agility or frequency diversity. A qualitative indication that frequency diversity will increase the fluctuation loss can be obtained by noting that the total return from a typical target consists of the superposition of the reflections from many individual scattering points. The above-noted article depicts various block diagrams for processing of such signals as well as target velocity processing for multiple channel waveforms.

Figure 2:
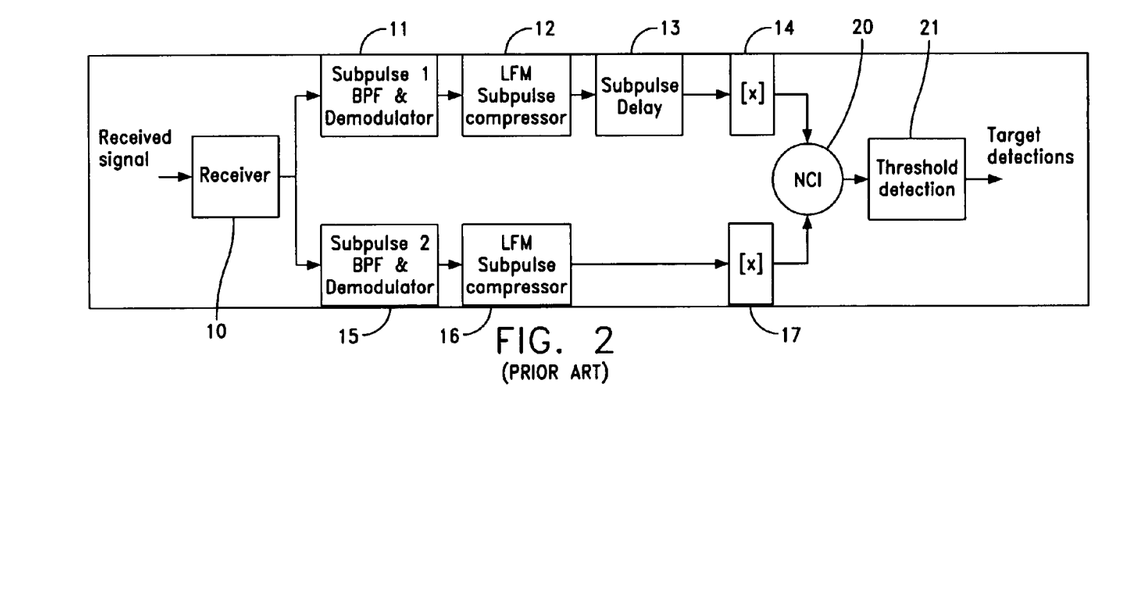
FIG. 2 depicts a block diagram of a prior art radar signal receiver processing circuitry for detecting targets using the subpulse format of FIG. 1.

Referring to FIG. 2, there is shown a typical processing system for prior art radars which employ frequency diverse subpulses. As seen in FIG. 2, a typical radar receiver 10 receives the radar signal and outputs the signal into two channels. The first channel contains a bandpass filter and demodulator 11 and is responsive to the first frequency designated as F1. The output from the bandpass filter and demodulator 11 is applied to the input of a linear frequency modulation (LFM) subpulse compressor 12. In the compressor 12 the pulse compression is formed on the subpulse F1. The output of the subpulse compressor 12 is applied to a subpulse delay module 13 whose output is applied to a module 14. Module 14 is the magnitude function module where it is the magnitude of the complex signal |x| which is processed in module 14 and applied to one input of a non-coherent integrator (NCI) 20.

A second channel for subpulse F2 contains a bandpass filter and demodulator 15. The bandpass filter and demodulator 15 is responsive to the frequency F2. The output of the bandpass filter and demodulator 15 is again applied to a LFM subpulse compressor 16. The output of the LFM subpulse compressor 16 is again applied to a module 17 which basically denotes the magnitude function where |x| is the magnitude of a complex signal x. The output of the complex signal module 17 is applied to the other input of the NCI 20. The output of the NCI 20 is applied to a threshold detection circuit 21 which threshold detection circuit determines the target detection. Thus, shown simply in FIG. 2 the received radar signal is processed by separating the two frequency channels (F1, F2) by using bandpass filtering and then performing match filtering or pulse compression on the individual subpulses F1 and F2. The two channels are then envelope detected, time aligned, non-coherently integrated, and then thresholded to detect targets. Additional coherent processing within the subpulse channels such as moving target indication (MTI) may also be performed prior to envelope detection. The use of the letter X in the bock diagram of FIG. 2 to designate a complex signal where the complex signal magnitude is shown in modules 14 and 17 serves to indicate the processing of the generic subpulses shown in FIGS. 1A and 1B.

Figure 3:
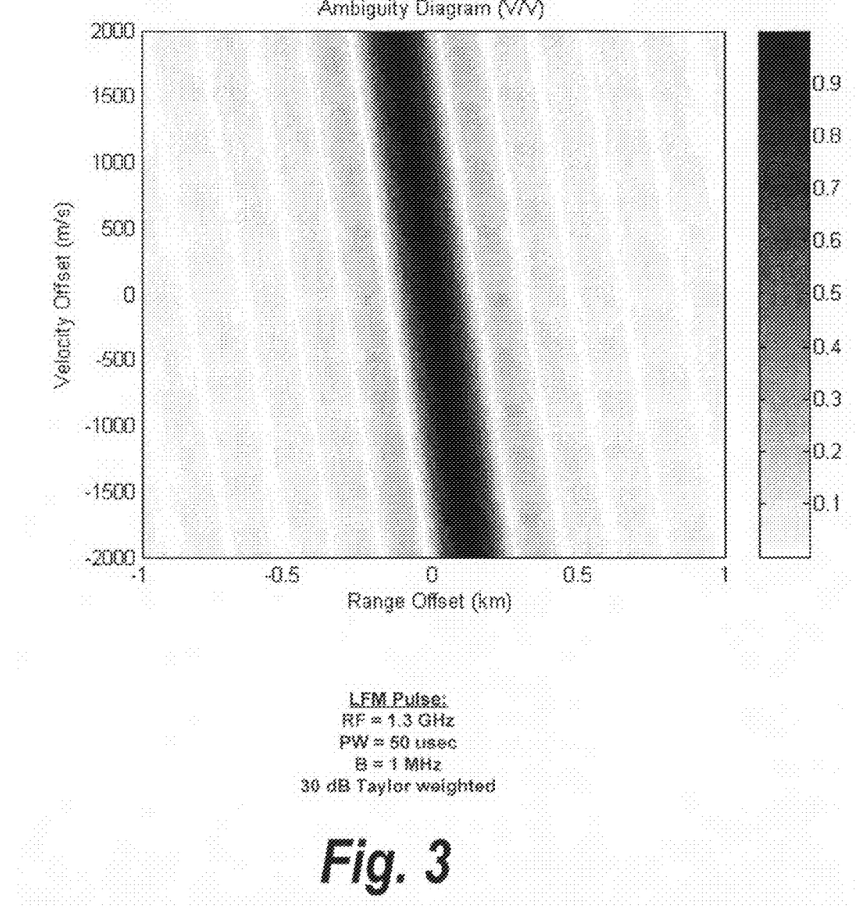
FIG. 3 shows an ambiguity diagram depicting velocity offset against range offset in a linear frequency modulation (LFM) system.

FIG. 3 shows a diagram of range versus velocity offset which basically depicts an ambiguity function. As is known, each pulse compressor channel as shown in FIG. 2 has an associated ambiguity function which defines the range and Doppler resolution of the subpulse waveform. Thus, FIG. 3 shows the ambiguity diagram for a linear frequency modulation (LFM) waveform. It is understood that this method can be applied to other phase or frequency codes as well. As seen from FIG. 3 the range resolution is approximately c/2B where c is the speed of light and B is the subpulse bandwidth. The subpulse bandwidth B is shown in FIG. 1B. If there are multiple targets within a single resolution cell the radar return or echo signal appears a single target echo and the radar therefore will underestimate the threat. FIG. 3 was generated depicting an RF signal of 1.3 Gigahertz (GHz) with a pulse width of 50 microseconds and a bandwidth of 1 Megahertz (MHz).

Figure 4:
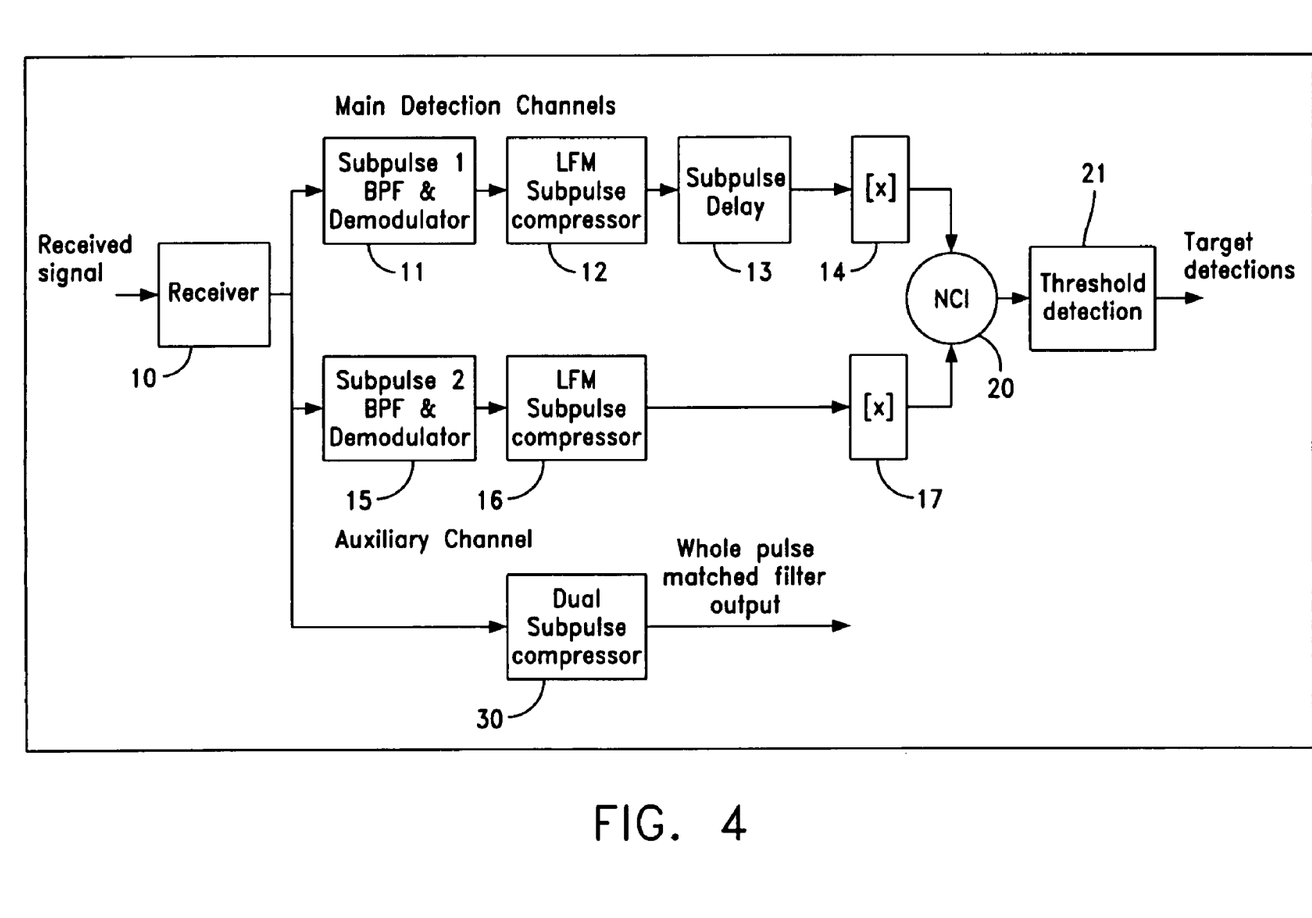
FIG. 4 depicts a diagram showing an auxiliary channel utilizing the processing structure shown in FIG. 2.
Figure 5:
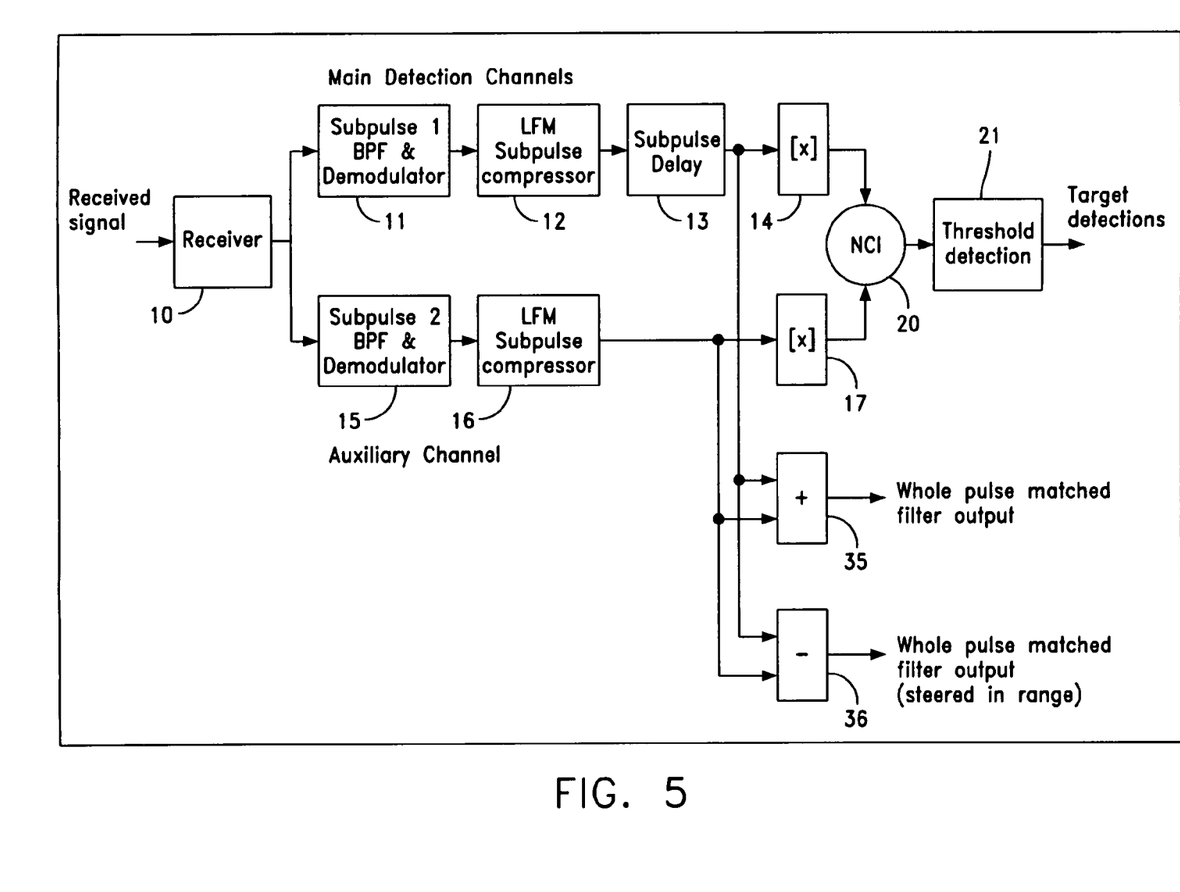
FIG. 5 depicts an equivalent implementation of the auxiliary channel of FIG. 4 which takes advantage of partial results available in the main channels.

Referring to FIGS. 4 and 5 there is depicted a block diagram of an apparatus for detection of multiple targets according to the teachings of this invention. Essentially, as seen in FIG. 4, a receiver is used which contains the dual detection channels for subpulse 1(F1) and subpulse 2 (F2) depicted in the prior figures. An auxiliary channel which is indicated by the dual subpulse compressor 30 is provided. This channel is in parallel with the normal processing path and the channel based on the dual subpulse compressor 30 will process the whole pulse rather than one individual subpulse.

Referring to FIG. 5 there is shown another exemplary arrangement illustrating that it is more efficient to synthesize the auxiliary channel which consisted of the dual subpulse compressor 30 in FIG. 4 into two original subpulse channels designated as 35 and 36. Thus, each subpulse channel as 35 and 36 provides the whole pulse matched filter output as for example by module 35 or the whole pulse matched filter output which is steered in range as indicated by module 36. The inputs to the modules 35 and 36 are obtained from each channel prior to the processing modules 14 and 17. Thus, module 35 (+) receives an input from channel 1 (F1) as from the output of the subpulse delay 13 and an input form channel 2 as from the output of the LFM subpulse compressor 16. The same inputs are applied to module 36 (−).

Figure 6:
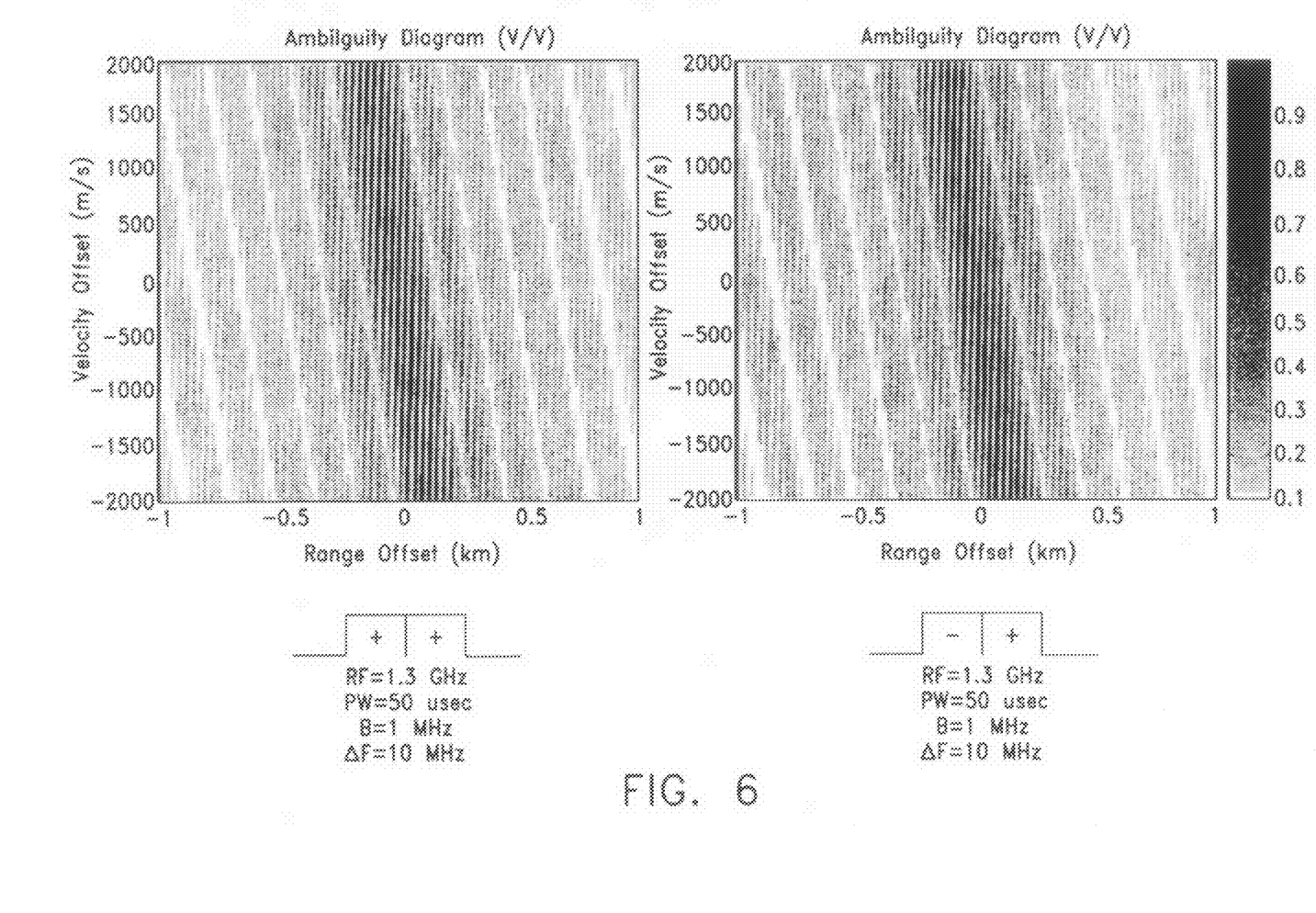
FIG. 6 shows an ambiguity diagram for a pulse pair processed as a single coherent pulse for detection of multiple targets.
Figure 7:
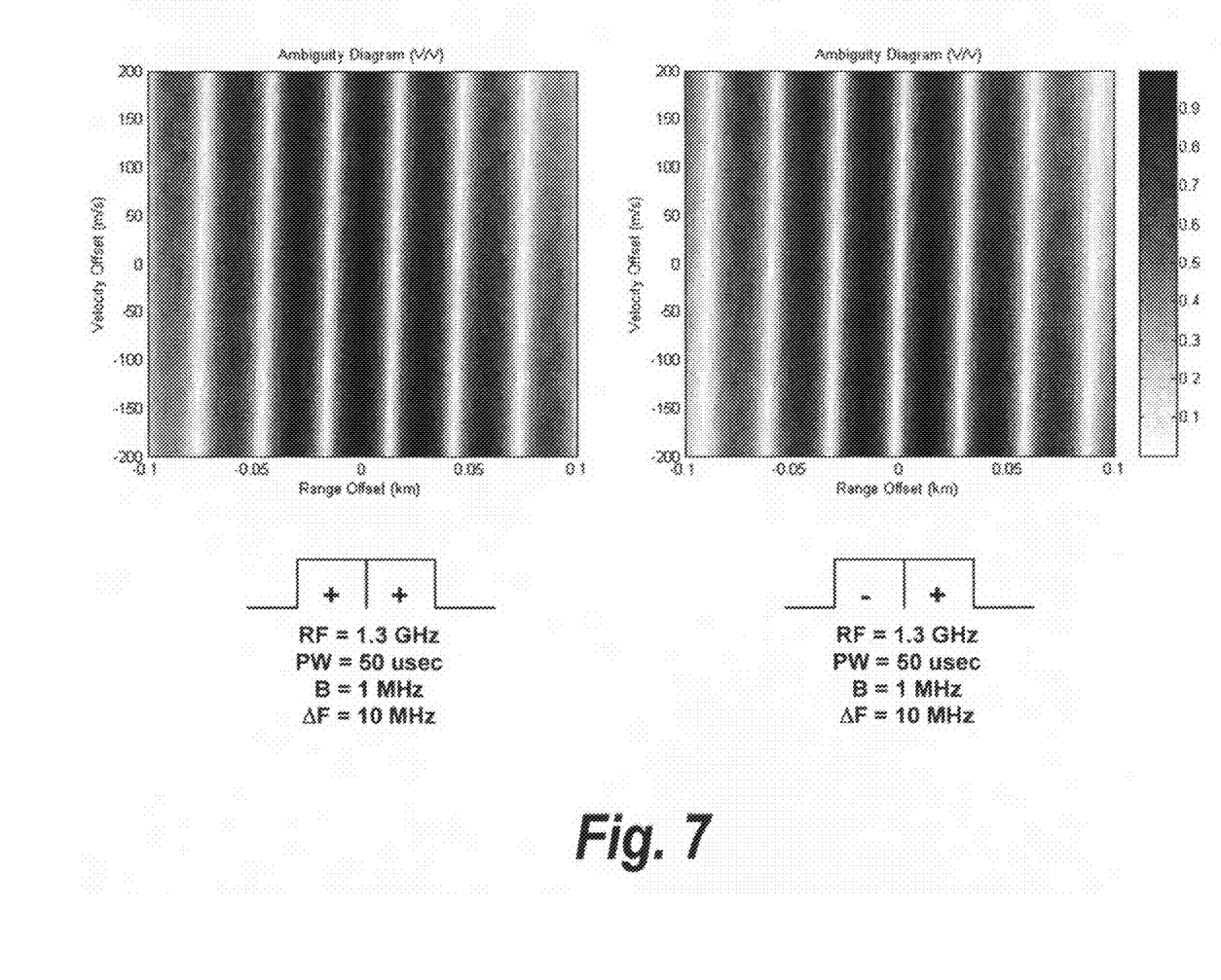
FIG. 7 shows an enlargement of the pulse pair ambiguity diagrams, depicting a pulse pair processed as a single coherent pulse.

Referring to FIG. 6 and FIG. 7, there is shown the ambiguity diagrams for pulse paths processed as a single coherent pulse. Both FIG. 6 and FIG. 7 depict a linear frequency modulation pulse path processed as a single coherent pulse. As can be seen from FIG. 6 and FIG. 7 the entire pulse has a higher total bandwidth than either subpulse. Thus, the parallel channel is depicted in FIG. 4 and FIG. 5 has a finer range ambiguity structure as shown in FIG. 6 and FIG. 7.

FIG. 7 basically is an expanded version of FIG. 6 where the range offset is shown as between −0.1 km and +0.1 km. By examining and comparing FIG. 6 and FIG. 7 against FIG. 3 one can see that the entire pulse has a higher total bandwidth than either subpulse. The fine structure within the main lobe of the ambiguity diagram is clearly visible in FIG. 7. Thus, the auxiliary channel as depicted in FIGS. 4 and 5 which processes the entire pulse is characterized by having a fine range resolution structure than the normal ambiguity function. The width of the range resolution lobe is approximately $c/2\Delta F$ (c=velocity of light and $\Delta F$ is the frequency difference between F1 and F2 (see FIG. 1B)). In this example, the whole pulse has 10 times narrower range resolution than a single subpulse, because the two subpulses are offset in frequency by an amount of 10 times the subpulse bandwidth. However, the auxiliary ambiguity function is highly ambiguous in range, with multiple lobes within the original range ambiguity cell. The range ambiguity repeat interval of this auxiliary channel is $c/\Delta F$. If the waveform contains more than two subpulses, then the ambiguity diagram will exhibit more space between the main lobes. It is noted that by combining the two subpulses out of phase, it is possible to shift the range peaks in the ambiguity function to interchange the peaks and valleys. This is shown on the right side graph of FIG. 7. In general, by applying a linear phase gradient when combining the subpulses in the auxiliary channel, the peak response can be steered in range. This is shown in FIG. 5 using module 36. This is analogous to steering the main lobe of the linear phased array. This range steering characteristic is exploited to determine the presence of multiple targets as will be explained. Two targets which fall within the same radar range cell in the main radar processing channels produce only one detection. But if they fall into different main lobe structures in the auxiliary channel, it is possible to identify the presence of the second target, just as targets within the different main lobes of a phased array can be separately determined.

Figure 8:
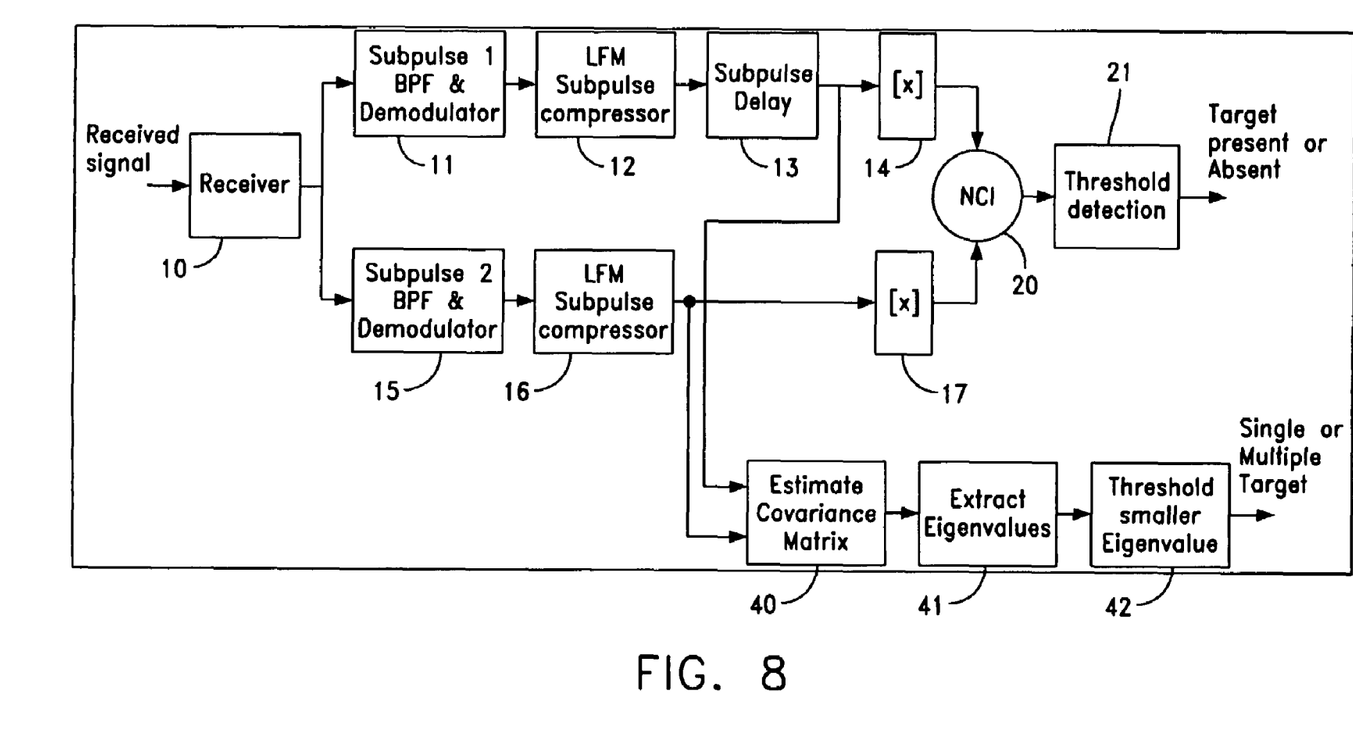
FIG. 8 shows a block diagram depicting an exemplary embodiment of an auxiliary channel according to this invention where one employs processing logic to determine the presence of a second target.

The processing logic to determine the presence of a second target is shown in FIG. 8. As one can see from FIG. 8 the double channel required for the frequency diversity radar system is depicted as the channels shown in FIG. 2 and FIG. 4. It is also noted that the same component values have been utilized to describe similar operating functions. It can be seen that the outputs from the subpulse delay module 13 as well as the output from the LFM subpulse compressor 16 are both applied to inputs of estimate covariance matrix module 40. Rather than actually forming the auxiliary channel with a pulse compressor the technique employed in FIG. 8 uses Eigenvalue decomposition to estimate the number of independent signals. As seen, the sample covariance matrix is formed between the two subpulse channels. It is of course understood that while two channels are shown, more than two channels may be implemented. After forming the covariance matrix 40 one now extracts the Eigenvalues as depicted in module 41. These Eigenvalues of the covariance matrix are extracted or found and the largest Eigenvalue is related to the strength of the first strongest target, and its associated Eigenvector contains the subpulse channel weights which maximize the target's response in the auxiliary channel. The second largest Eigenvalue corresponds to a second target if one is present and resolvable in the higher bandwidth auxiliary channel. If there is no second target present, the second Eigenvalue corresponds to the background noise level. Therefore, the second Eigenvalue can be compared to the noise level to decide if a second target is present. This is shown in module 42 where one thresholds the smaller Eigenvalues to determine whether or not there is a single or multiple target output.

To form the covariance matrix, few samples of the target are needed. A covariance matrix is well known and is a matrix of covariances between elements of a vector. From a covariance matrix a transformation matrix can be derived that allows one to decorrelate data, from a different point of view, to find an optimal basis for representing the data in a compact way. The derivation of the maximum-likelihood estimator of the covariance matrix of a multivariate normal distribution involves a special theorem. The estimation of covariance matrices is well known as is the matrix. See for example, a text entitled "Multivariate Analysis (1979) (Academic press by K. V. Mardia, J. T. Kent and J. M. Bibby. Once the matrix is present one can extract the Eigenvalues. A linear transformation operates on a vector to change it both in magnitude and direction. An Eigenvector of a given linear transformation is a vector which is multiplied by a constant called the Eigenvalue during that transformation. Radar referring signals employing frequency diversity signals can be treated as vectors and have the covariance matrix and Eigenvalues apply. The processing circuitry to implement modules 40, 41 and 42 can be performed by a processor such as a microprocessor or a DSP or a custom programmable logic array. These processors are known and available and have been used in processing of harmonic modes, quantum states, frequencies and so on.

Figure 9:
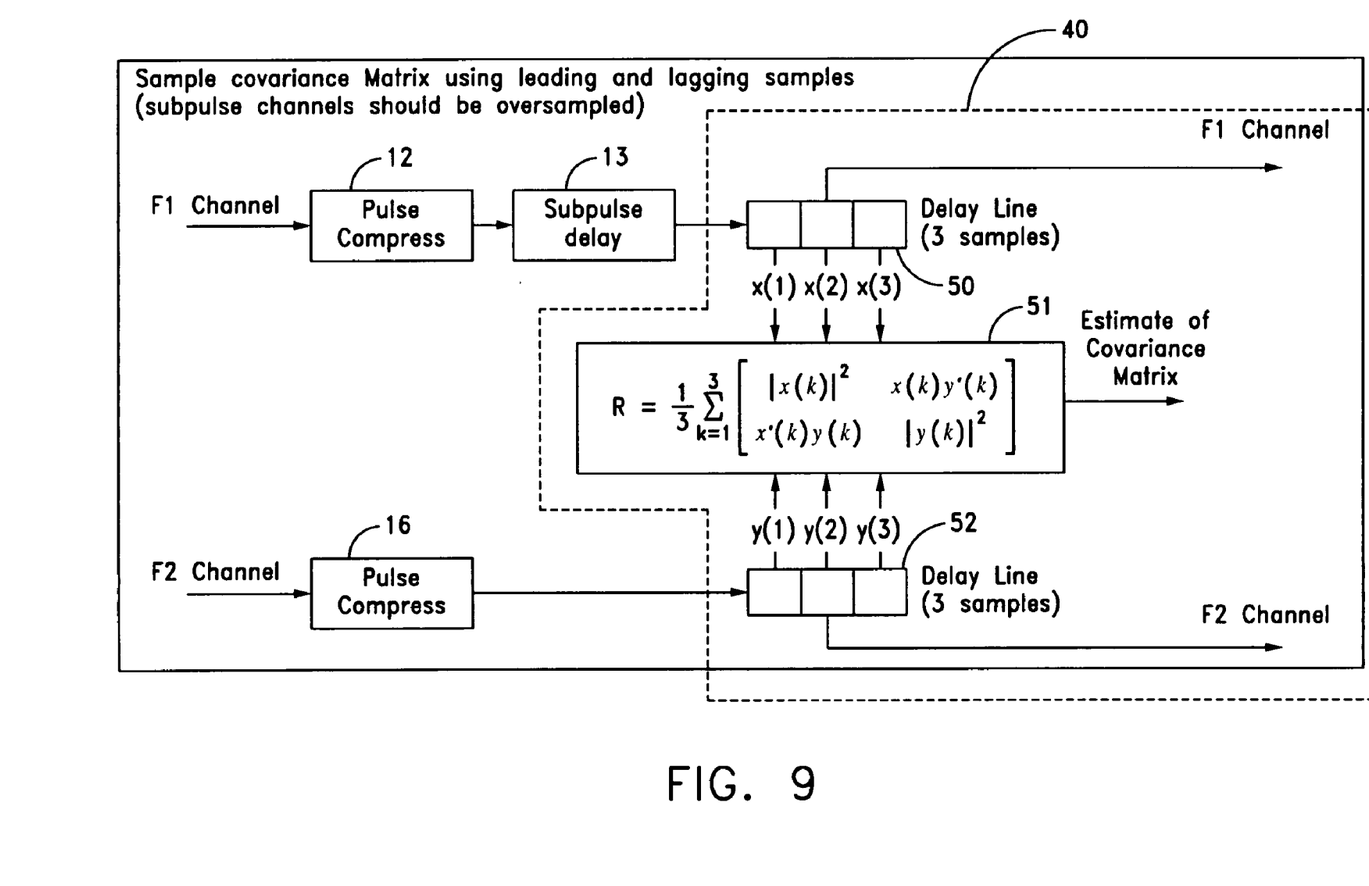
FIG. 9 depicts a block diagram of processing circuitry for forming a sample covariance matrix according to an embodiment of this invention.

Referring to FIG. 9, there is shown an embodiment which relies on a radar sample rate which oversamples the signal bandwidth. As seen in FIG. 9 the dashed line encloses the components which would be contained in module 40 of FIG. 8. Thus, enclosed within the dashed line is the structure operative to form a sample covariance matrix. As seen the subpulse delay module output is now applied to the input of a delay line 50. The delay line 50 operates to delay three samples of subpulses designated as X (1), X(2), X(3) from channel F1. In a similar manner the output from pulse compressor 16 is also applied to a sample delay line 52 which also delays the three samples designated as Y(1), Y(2), Y(3) from channel F2. The outputs from the delay line are applied to a module 51. Module 51 operates to take the samples from delay lines 50 and 51 and from the samples forms a sample covariance matrix. As seen in FIG. 9 the output 55 of module 51 is the estimate of a covariance matrix. The technique shown in FIG. 9 forms the covariance matrix between subpulse channels and uses the samples where the target detection is found, plus one additional sample before and after target detection to form the sample covariance matrix. This technique relies on the fact that target energy is present in neighboring samples while the noise in those samples is at least partly decorralated. Depending on the oversampling ratio this technique can be adjusted to include fewer or greater number of samples. For low oversampling ratios the variation is to use only the one neighboring sample with the larger amplitude.

Figure 10:
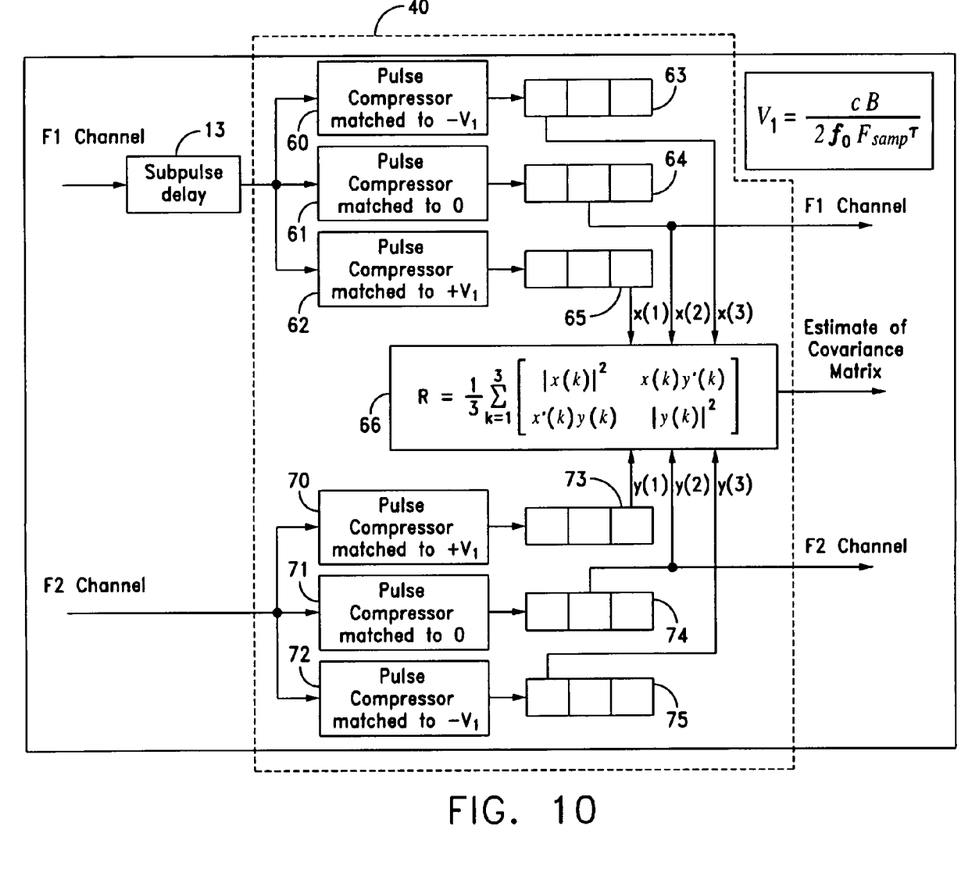
FIG. 10 shows a block diagram of processing circuitry for forming a covariance matrix according to another embodiment of this invention.

Referring to FIG. 10, there is shown another technique used to form the sample covariance matrix. This technique is specifically employed with LFM subpulse waveforms and relates to linear frequency modulation. As seen in FIG. 10, the dashed line encloses the components necessary to estimate the covariance matrix 40 of FIG. 8 and thus the components shown within the dashed lines of FIG. 10 provide a method for estimating the covariance matrix. This method exploits the LFM range by its property to generate multiple estimates of the target signal with partly decorrelated noise samples. By matching the pulse compressor to a velocity other than 0 the target response is shifted in range. Thus, referring to FIG. 10 there is shown for the F1 channel three pulse compressors, with pulse compressor 60 matched to $-V_1$, pulse compressor 61 matched to 0, and pulse compressor 62 matched to $+V_1$. Each pulse compressor output is associated with a separate delay line as 63, 64 and 65 whereby the samples from each of the delay lines as x(1), x(2), x(3), are directed to the covariance matrix forming module 66. In a similar manner there are three pulse compressors associated with the F2 channel designated as 70, 71 and 72. These again are related to $+V_1$, 0 and $-V_1$. Each output of the pulse compressor is associated again with respective delay lines as 73, 74 and 75 and hence the delayed samples y(1), y(2), y(3) are again applied to module 66. Module 66 operates to form the covariance matrix from the samples as x and y emanating from the delay lines associated with each of the channels. By matching the pulse compressor to a velocity other than zero the target response has shifted in range as indicated above. The three pulse compressors in each channel are employed which offset the target response into three different range samples surrounding target detection. The three samples from the two subpulse channels are used to form sample covariance matrix. This method for estimating the covariance has a disadvantage that requires additional processing as can be seen from FIG. 10. However, it has the advantage that it does not require oversampling of the radar waveforms.

Figure 11:
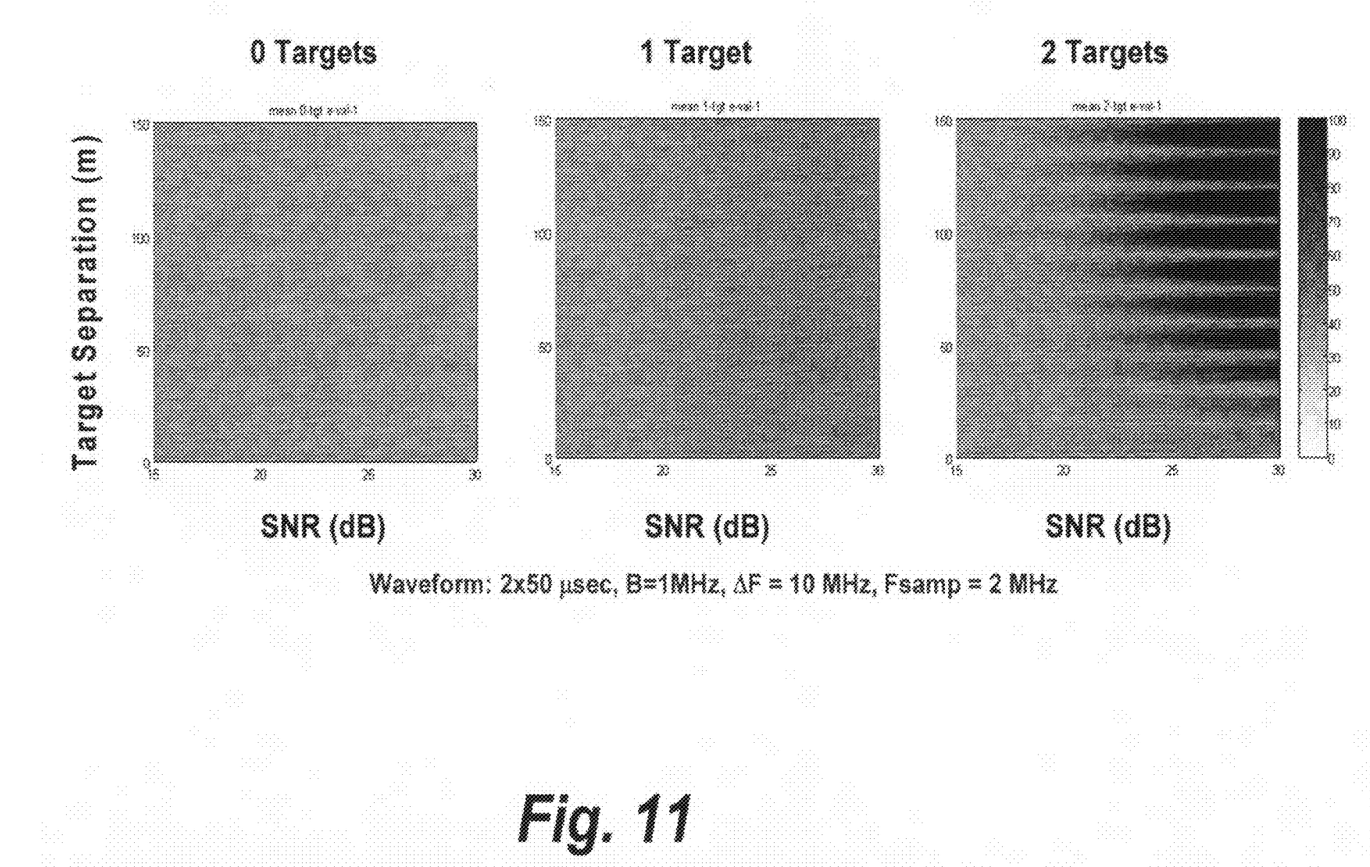
FIG. 11 depicts three diagrams showing the average value smaller Eigen vectors to indicate how two targets can be discerned or detected according to embodiments of the invention.

FIG. 11 shows exemplary characteristics of the smaller Eigenvalues. As seen, FIG. 11(a) depicts the average value for no targets while the center(b) predicts the average value of a smaller Eigen vector for one target while the right end(c) waveform depicts the average value which would exist with two targets. The characteristics of the waveforms are shown in FIG. 11 whereby the bandwidth the frequency deviation and the sampling rate are all depicted. In any event, FIG. 11 shows how the smaller Eigenvalue is indicative of the presence of a second target. When one target is present, the second Eigenvalue is relatively small. This is about the value that would be expected from only noise and can serve as the threshold. However, a second target of sufficient SNR and appropriate range results in significant increase in the smaller Eigenvalue as shown in the graph depicted on the right. Thus, as shown in FIG. 11 the second target cannot be detected if it falls at the range ambiguity of the auxiliary channel. This effect can be mitigated by changing the frequency spacing between the subpulses causing the ambiguous range to fill in over the life of a track.

Thus, in regard to the above, one can understand that the capability of detecting multiple targets exists in returned radar waveforms which contain two or more frequency diverse subpulses. Typically these pulses are processed non-coherently for target detection achieving a range resolution associated with the subpulse bandwidth. The prior art structure for doing this is depicted in FIG. 2. It is shown that these radar waveforms if processed coherently contain enough information to estimate whether the return is from a single aircraft or from multiple aircraft flying in formation.

Figure 12:
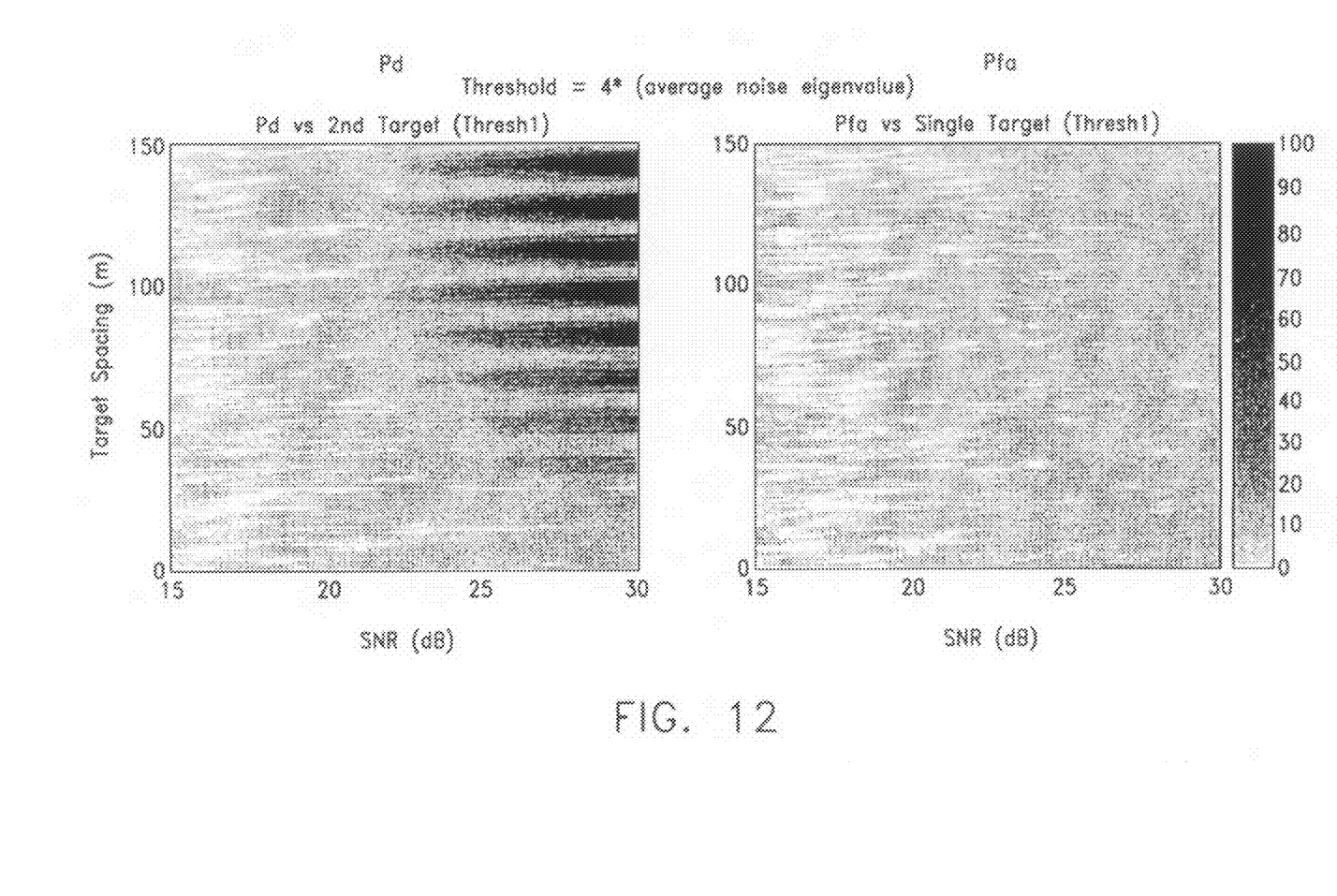
FIG. 12 depicts two diagrams showing the probability of detecting a second target, and the probability of falsely reporting a second target for the situation where only one target is present.

While the above describes the waveform consisting of two subpulses, the method is easily extended to three or more subpulses. The additional radar processing to perform the target assessment is relatively simple to implement. This is because only range cells producing detections need to be examined for a second target. There are ambiguities within the multi-subpulse waveform processing which make it impossible to detect the multiple targets spaced at certain range offsets. This limitation can be mitigated by varying the frequency offset between the subpulses during subsequent radar transmissions. By accumulating the results of multiple target detections, the performance can be improved. It is found that the SNR (Signal-to-Noise Ratio) needed for reliable detection of the second target is higher than needed in simple target detection. This is illustrated in FIG. 12, which shows typical results for probability of detection and probability of false alarm as it applies to the second target declaration. Therefore, when applying this method, the radar's confidence in the result should be based on the measured SNR.

While the above technique describes a method and apparatus for discriminating or detecting multiple targets within a radar resolution cell, it can also be employed to discriminate short targets from long targets. As for example artillery shells from tactical ballistic missiles. The technique can further be employed for the detection of multi path operations with appropriately selected frequency bands and pulse bands.

Thus, one skilled in the art would understand how to extend the above and to consider many alternate configurations which would be discerned by those skilled in the art and which are considered to be included within the spirit and scope of the claims appended hereto.

What is claimed is:

1. A method for detecting multiple targets in a frequency diverse radar system, comprising the steps of:
   providing a frequency diverse radar employing a radar waveform of at least two frequency diverse subpulses,
   receiving an echo signal from said frequency diverse radar,
   processing said received signal in at least two channels, each channel responsive to one of said subpulses, for processing said subpulse,
   non-coherently integrating both processed subpulses to detect the presence of a target,
   forming a covariance matrix from each processed subpulse,
   performing an Eigenvalue decomposition from said matrix,
   thresholding said decomposed Eigenvalues to select those Eigenvalues indicating a signal strength above a predetermined threshold; determining multiple targets when more than one Eigenvalue exceeds said threshold.

2. The method according to claim 1, wherein the step of forming a covariance matrix includes the steps of:
   oversampling the received radar signals in each channel to provide multiple range samples for each channel, and
   forming a covariance matrix using said samples in each channel.

3. The method according to claim 1, wherein the step of forming a covariance matrix includes the steps of:
   providing range pulse compression in each channel to force the subpulse channel signal to appear in different ranges,
   extracting a given number of samples from each range pulse compression,
   forming a covariance matrix from said extracted samples.

4. A method to detect the presence of multiple targets in a radar system employing a waveform of at least two frequency diverse subpulses, said system processing received samples signals in a separate channel for each subpulse, comprising the steps of:
   forming a sample covariance matrix between the subpulse frequency channels,
   extracting Eigenvalues from said matrix,
   determining the strength of extracted Eigenvalues compared to a threshold value,
   indicating the presence of multiple targets if more than one Eigenvalue exceeds said threshold value.

5. The method according to claim 4, wherein the step of forming said covariance matrix comprises the steps of:
   oversampling the received radar signal in each channel to provide multiple range samples for each channel, and
   forming a covariance matrix using said samples.

6. The method according to claim 4, wherein the step of forming said covariance matrix comprises the steps of:
   providing range pulse compression in each channel to force the subpulse signal to appear at different ranges,
   extracting a given number of samples from each range pulse compression,
   forming a covariance matrix from said extracted samples.

7. Apparatus for detecting multiple targets in a frequency diverse radar system employing a radar waveform consisting of at least two frequency diverse subpulses, where received radar signals are processed in separate channels, one channel for each subpulse frequency and the processed channel signals are non-coherently combined for the purpose of target detection, comprising:
   means coupled to each channel for forming a covariance matrix,
   means responsive to said matrix for extracting Eigenvalues,
   threshold means responsive to extracted Eigenvalues to select Eigenvalues exceeding a given threshold,
   means coupled to said threshold means and operative to provide an output indicative of multiple targets when at least two Eigenvalues exceed said threshold.

8. The apparatus according to claim 7, wherein said means for forming said covariance matrix includes:
   a first sampler coupled to said first subpulse channel to provide a first series of sample pulses from said first channel,
   a second sampler coupled to said second subpulse channel to provide a second series of sample pulses from said second channel, and
   a covariance matrix generator responsive to said first and second series of pulses to form a covariance matrix from said series of pulses.

9. The apparatus according to claim 8, wherein said first and second samples each include a delay line of a given number of sample delays.

10. The apparatus according to claim 7, wherein said means for forming said covariance matrix comprises:
   a first plurality of pulse compressors coupled to said first channel each operative to provide at an output a range shifted first channel subpulse,
   a second plurality of pulse compressors coupled to said second channel each operative to provide at an output a range shifted second channel subpulse,
   a covariance matrix generator responsive to said first and second channel range shifted subpulses to provide a covariance matrix at an output.

* * * * *